United States Patent
Hahn

(10) Patent No.: US 11,794,335 B2
(45) Date of Patent: Oct. 24, 2023

(54) MODULAR ROBOT SYSTEM FOR A CONTAINER PROCESSING FACILITY

(71) Applicant: KRONES AG, Neutraubling (DE)

(72) Inventor: Wolfgang Hahn, Neutraubling (DE)

(73) Assignee: KRONES AG, Neutraubling (DE)

( * ) Notice: Subject to any disclaimer, the term of this patent is extended or adjusted under 35 U.S.C. 154(b) by 186 days.

(21) Appl. No.: 17/283,517

(22) PCT Filed: Jul. 17, 2019

(86) PCT No.: PCT/EP2019/069179
§ 371 (c)(1),
(2) Date: Apr. 7, 2021

(87) PCT Pub. No.: WO2020/074147
PCT Pub. Date: Apr. 16, 2020

(65) Prior Publication Data
US 2021/0387328 A1    Dec. 16, 2021

(30) Foreign Application Priority Data

Oct. 12, 2018 (DE) ..................... 10 2018 217 471.7

(51) Int. Cl.
*B25J 5/00* (2006.01)
*B25J 9/08* (2006.01)
*B25J 9/00* (2006.01)

(52) U.S. Cl.
CPC .............. *B25J 9/08* (2013.01); *B25J 5/007* (2013.01); *B25J 9/0084* (2013.01)

(58) Field of Classification Search
CPC ... B25J 5/00; B25J 5/007; B25J 9/0084; B25J 9/08
See application file for complete search history.

(56) References Cited

U.S. PATENT DOCUMENTS

2003/0055525 A1* 3/2003 Graham ........... G05B 19/41825
                                                    700/200
2004/0093650 A1* 5/2004 Martins ................ G05D 1/0274
                                                    180/167
(Continued)

FOREIGN PATENT DOCUMENTS

DE         10064217 A1   7/2002
DE    102007060568 A1   6/2009
(Continued)

OTHER PUBLICATIONS

ISA European Patent Office, International Search Report Issued in Application No. PCT/EP2019/069179, dated Oct. 16, 2019, WIPO, 6 pages.

(Continued)

*Primary Examiner* — Dale Moyer
(74) *Attorney, Agent, or Firm* — McCoy Russell LLP

(57) ABSTRACT

Modular robot system for a container processing facility, comprising a mobile platform, which comprises a chassis that is supported on the floor for moving in a working area of the container processing facility, and comprising multiple robot units of different types for carrying out jobs of different types in the container processing facility, wherein the mobile platform and/or the robot units are designed such that the robot units can selectively be connected to the mobile platform in order to transport each robot unit in the container processing facility and position it for the respective job.

15 Claims, 5 Drawing Sheets

(56) References Cited

U.S. PATENT DOCUMENTS

| | | | | |
|---|---|---|---|---|
| 2014/0343714 | A1* | 11/2014 | Clark | B25J 9/16 |
| | | | | 700/214 |
| 2016/0236867 | A1 | 8/2016 | Brazeau et al. | |
| 2016/0346922 | A1* | 12/2016 | Shelton | H02J 7/0045 |
| 2017/0057081 | A1* | 3/2017 | Krohne | B25J 9/08 |
| 2019/0129399 | A1* | 5/2019 | Wagner | B65G 1/0471 |
| 2019/0248007 | A1* | 8/2019 | Duffy | B25J 15/0066 |
| 2020/0254607 | A1* | 8/2020 | Ejstrup Hansen | B66F 9/063 |
| 2021/0154849 | A1* | 5/2021 | Ichimaru | B25J 9/1682 |
| 2023/0107431 | A1* | 4/2023 | Hashiguchi | B25J 9/1605 |
| | | | | 700/246 |

FOREIGN PATENT DOCUMENTS

| | | |
|---|---|---|
| DE | 202012100646 U1 | 6/2013 |
| DE | 102015216272 A1 | 3/2017 |
| WO | 2009146899 A1 | 12/2009 |

OTHER PUBLICATIONS

"Ridgeback Omnidirectional Development Platform—Heavy Development Platform for Mobile Manipulation and Custom Payloads," Level Five Supplies Website, Available Online at https://levelfivesupplies.com/wp-content/uploads/2020/08/Clearpath-Ridgeback-Brochure.pdf, Available as Early as Aug. 2020, 2 pages.

* cited by examiner

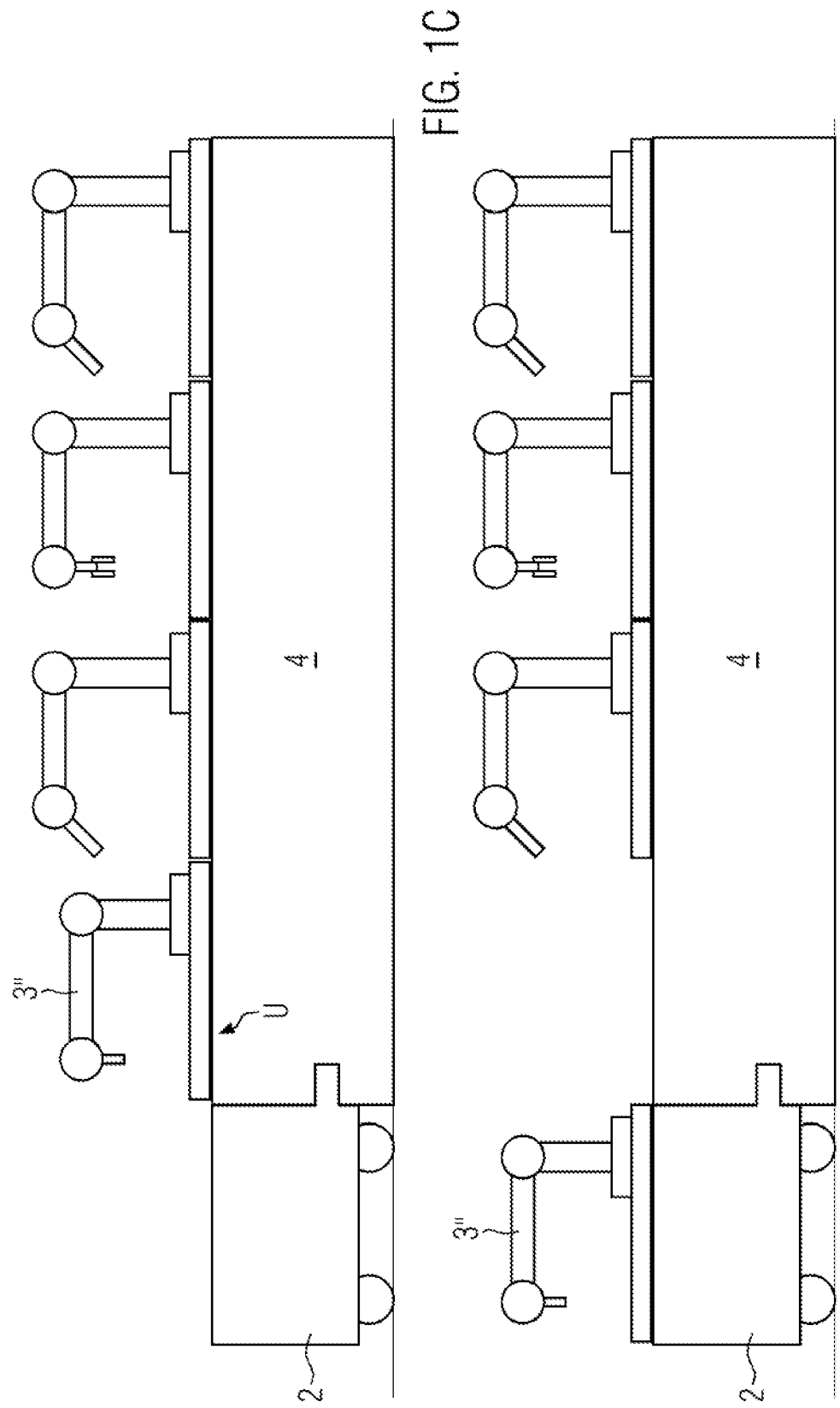

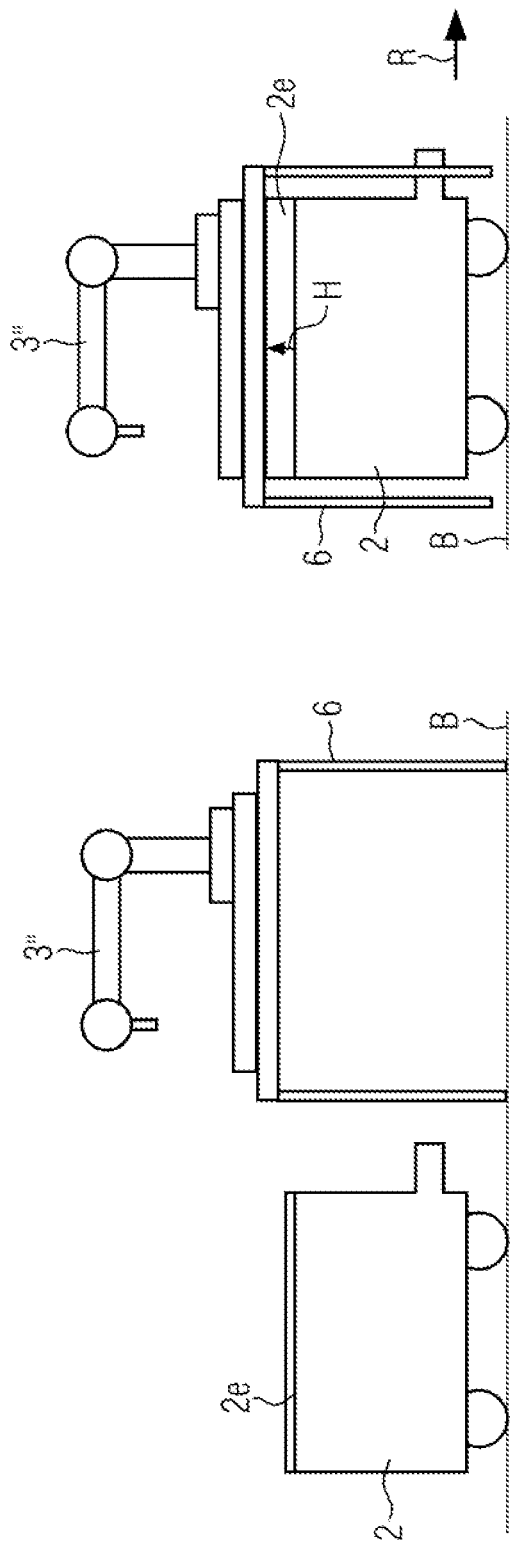
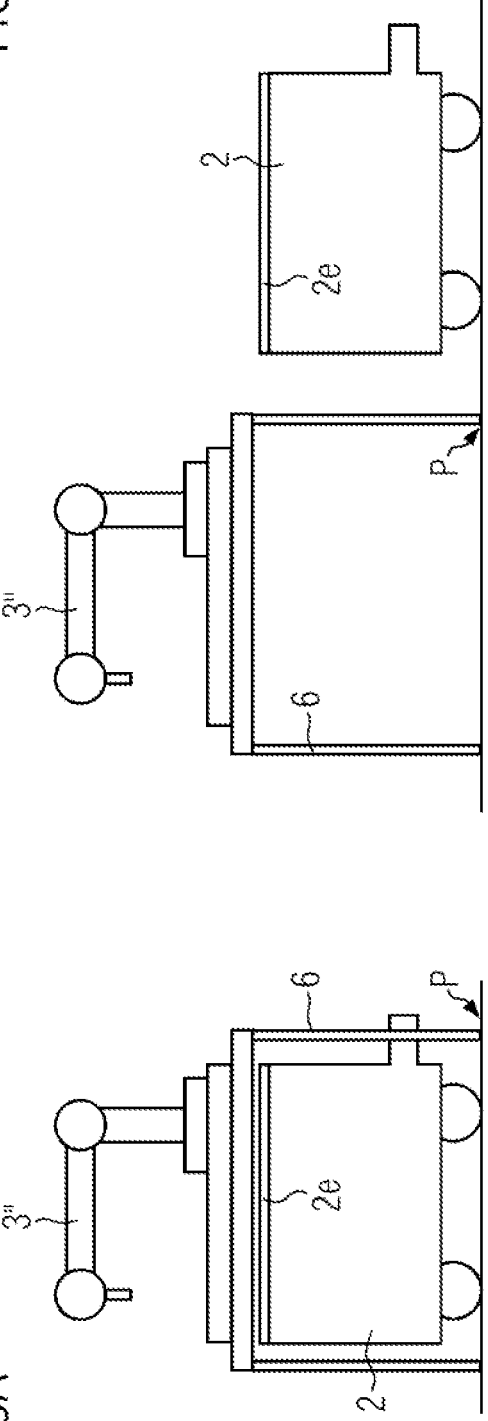

MODULAR ROBOT SYSTEM FOR A CONTAINER PROCESSING FACILITY

CROSS REFERENCE TO RELATED APPLICATIONS

The present application is a U.S. National Phase of International Application No. PCT/EP2019/069179 entitled "MODULAR ROBOT SYSTEM FOR A CONTAINER PROCESSING FACILITY," and filed on Jul. 17, 2019. International Application No. PCT/EP2019/069179 claims priority to German Patent Application No. 10 2018 217 471.7 filed on Oct. 12, 2018. The entire contents of each of the above-listed applications are hereby incorporated by reference for all purposes.

TECHNICAL FIELD

The invention relates to a modular robot system for a container processing facility and a method for a modular robot system.

BACKGROUND AND SUMMARY

Robot systems are typically employed in container processing facilities to carry out jobs of many different kinds, for example, maintenance and/or servicing works at container handling machines. For example, a job can consist in providing the conveyor belt of a container handling machine with lubricant.

DE 100 64 217 A1 discloses a packaging line with a conveyor means for transporting products to be packed, and with a handling means movable relative to the conveying means.

In WO 2009/146899 A1, a multidirectionally movable vehicle comprising a mobile vehicle and a robot arm arranged thereon is disclosed. For an independent mobility, wheels are arranged at the vehicle which are controlled by an on-board controlling system.

It is a disadvantage here that the application of the known robot systems is restricted due to the diverse jobs in view of the carrying power, range, tools etc., and that they are, as a consequence, not sufficiently used to capacity.

DE 10 2015 216 272 A1 discloses a modular robot kit with a robot platform and a robot working head which can be modularly interconnected via a robot adapter to employ them flexibly in a multitasking environment.

It is a disadvantage here that the platform itself is not required when the respective job is being carried out and therefore is not used to capacity. Moreover, the platform can lead to restrictions of the positioning of the working head relative to the container handling machine while the job is being carried out.

It is therefore the object of the present invention to provide a modular robot system for a container processing facility which can be better used to capacity and which is less restricted in the performance of jobs.

To achieve this object, the invention provides a modular robot system for a container processing facility having the features of claim 1. Advantageous embodiments of the invention are stated in the sub-claims.

By the mobile platform and/or the robot units being designed such that the robot units can be selectively connected to the mobile platform to transport them each in the container processing facility and position them for the respective job, one of the robot units can be flexibly combined with the mobile platform, depending on the job, and then be positioned in the working area of the container processing facility. Moreover, the positioned robot unit can then carry out the job separate from the mobile platform so that the mobile platform can be used for another one of the robot units in the meantime. Consequently, the modular robot system can be better used to capacity.

The container processing facility can comprise a plurality of container handling machines which are interconnected via one or more transporters. Container handling machines can be understood as a machine for handling containers for packaging a beverage. The container handling machines can comprise a container manufacturing machine, a rinser, an inspection device, a labelling machine, a filler for packaging a beverage into the containers, a packaging machine and/or a palletiser. Robot mounts for the robot units can be arranged at the container handling machines. Thereby, the robot units can be securely positioned at the container handling machines separate from the mobile platform.

The containers can be provided for receiving a fluid product, such as a beverage, a food item, a pharmaceutical product, a medical product, a cleansing agent, a spray and/or a body care product. Preferably, the container can mean a beverage container. A beverage can mean mineral water, a soft drink, a juice and/or beer. A food item can mean a product, such as the beverage, vinegar, edible oil and/or the like. Preferably, a container in which a liquid or pasty product is transported from the manufacturer to the consumer can be meant.

The containers can be provided for packaging the fluid product into them and provide them with a closure. The containers can be plastic bottles, glass bottles, cans and/or tubes. Plastic bottles can be specifically PET, PEN, HD-PE or PP bottles. They can equally be biodegradable containers whose main components consist of renewable resources, such as, for example, sugar cane, wheat or sweetcorn.

The mobile platform can comprise a frame on which the chassis that is supported on the floor is arranged. The frame can selectively be connectable to one of the robot units. It is conceivable for the frame to be designed like a housing. The chassis that is supported on the floor can comprise a plurality of wheels, at least one of the wheels being designed to be driven and/or steerable. As a drive, the chassis that is supported on the floor can comprise an electric motor which is preferably designed to be controllable. For example, it can be a servomotor. It is also conceivable that the chassis that is supported on the floor comprises a steering drive to steer at least one of the wheels. For power supply, the mobile platform can comprise a rechargeable battery and/or an electric interface.

The robot units can each comprise one robot arm with at least one controllable joint and/or a travel unit for moving a tool or a tool holding fixture. The tool can be designed, for example, as a gripper to grip an object, such as a container, for example. It is also conceivable that the tool comprises a nozzle or the like to apply, for example, a cleaning medium or a lubricant. The tool holding fixture can be designed to receive tools of different types with it. Preferably, the robot arm or the travel unit can be designed to move the tool three-dimensionally in the space. However, a two-dimensional or one-dimensional movement is also conceivable. It is conceivable that at least one of the robot units comprises a rechargeable battery for power supply. The robot units can be collaboratively and/or cooperatively working robot units.

The robot system can be designed such that at least one of the robot units independently connects the energy and/or media supply at a working area, in particular at a working area of a container handling machine. Thereby, the robot system itself can establish the energy and/or media supply without an operator at the site of application. The working area can in particular be a site of application of the robot unit. To this end, it is advantageous to arrange the at least one pin-and-socket connection in the active region of the positioned robot unit. The pin-and-socket connection can be designed such that it is effected by the positioning, a changing operation and/or an exchange of the robot unit automatically or by actuating the pin-and-socket connection. To this end, it is advantageous to use standardised pin-and-socket connections which in particular permit any combination of all types of the robot units with the container handling machine.

The mobile platform can comprise a robot mount to selectively pick up one of the robot units and position it at a container handling machine for the job. This permits to receive the robot units each in a precise position and/or in a secured manner with the mobile platform. For example, the robot mount can be a plate with a positioning element arranged at the above-described frame to receive one of the robot units each. It is conceivable that the robot units each comprise a stand which is removably connectable to the robot mount. The stand can be designed such that the corresponding robot unit stably stands on a contact area and/or contact feet of the stand without being supported from outside.

The mobile platform and the robot units may each be designed with a separate controlling unit so that they can be employed autonomously. Thereby, the mobile platform can be employed, while the jobs are being processed by one of the robot units, for transporting another one of the robot units. The controlling units can each be, for example, a separate machine control, in particular each having a microprocessor, a storage unit, a data interface, an input for a sensor, an output for a drive, an actuator or the like, an input unit and/or output unit, such as a display. It is conceivable that the controlling units are designed with data interfaces to mutually exchange data.

The mobile platform can be designed to be self-navigating. Thereby, the mobile platform can work independent of a superordinated controlling centre. "Self-navigating" can mean here that the mobile platform processes data of the working area and/or at least one navigation sensor such that the mobile platform can autonomously move within the working area. "Data of the working area" can here mean, for example, a plan of the arrangement of the container handling machines of the container processing facility and/or of paths for the mobile platform.

The modular robot system can comprise a stationary platform designed to position and/or receive one of the robot units at a working site. Thereby, the robot unit can be particularly easily and precisely positioned, for example, at a container handling machine. Moreover, the job can be carried out at the stationary platform so that the mobile platform can work to capacity by transporting one of the other robot units in the meantime. The stationary platform can be designed like a table, in particular with an underframe for supporting it on the floor, and with a robot mount for picking up the robot unit.

The mobile platform can be designed to pick up the stationary platform, transport it and/or position it at the working site, in particular together with the robot unit picked up by the stationary platform. Thereby, the mobile platform can be utilised both for the transport of the respective robot unit and of the stationary platform. It is conceivable for the mobile platform to comprise a lifting unit to lift the stationary platform with or without the picked-up robot unit during transport, and/or to lower it for positioning it at the working site. The lifting unit can comprise a liftable mount for the stationary platform and/or for the robot unit. It is also conceivable that the mobile platform comprises a lifting unit to lift one of the robot units for transport and/or during positioning.

The mobile robot system can comprise an accessory trailer that can be coupled to the mobile platform, in particular to pick up a tool, a set-up part, a cleaning unit, a lubrication system, a lubricant, a raw material, an auxiliary agent, an operating material, testing equipment, a spare part and/or servicing means. Thereby, the mobile robot system can be employed even more flexibly since the jobs can be selectively carried out with or without the accessory trailer. Moreover, the transport capacity of the mobile platform can thus be extended in an easy way. The couplable accessory trailer can comprise a separate chassis that is supported on the floor and/or one or more accessory compartments. It is conceivable that the accessory compartments are designed as drawers, shelves, and/or as box compartments. The mobile platform and the accessory trailer can be connectable to each other via a removable coupling device. It is also conceivable for the coupling device to be controlled with the controlling unit such that the accessory vehicle is selectively removed from the mobile platform or connected thereto.

The mobile platform, the stationary platform and/or at least one of the robot units can comprise a protection means. Thereby, an operator can be better protected from injuries. It is conceivable that the protection means comprises mechanical locking elements, a light curtain, a 3D detection sensor, a light barrier, and/or an emergency stop switch. The 3D detection sensor can mean here, for example, a laser scanner which detects a protection range of the robot unit and deactivates the robot unit if an operator enters the protection range.

The modular robot system can comprise a magazine for the robot units which is designed such that the robot units can be withdrawn therefrom selectively or sequentially with the mobile platform. Thereby, the robot units can be provided flexibly for the connection with the mobile platform. It is conceivable that the magazine comprises a conveyor means for the robot units which is designed such that it transports a robot unit selected for the connection with the mobile platform to a transfer point. For example, the magazine can comprise, as a conveyor means, a rotating platform and/or a conveyor belt. The magazine can be designed such that the mobile platform returns one of the robot unit to it after the job has been completed.

It is conceivable that at least at one working site, at least one sensor unit and/or one actuator unit is arranged which can be connected to at least one of the robot units via an electric interface or an air interface. Thereby, the at least one of the robot units can cooperate, during the performance of the job, for example with the sensor unit and/or the actuator unit provided at a container handling machine. For example, the sensor unit can be a shaft encoder or a camera, or the actuator unit can be a drive of a conveyor means.

At least at one working site, an energy and/or media supply unit can be arranged for the robot unit and/or for the mobile platform. Thereby, rechargeable batteries of the robot unit and/or the mobile platform can also be charged at the respective working site.

The modular robot system can comprise a superordinated controlling centre to control the mobile platform and the robot unit, in particular for the jobs. Thereby, the employment of the mobile platform and the robot unit can be coordinated. The controlling centre can be, for example, a computer system into which an operator enters the jobs. It is conceivable that the controlling centre is designed to control a plurality of the mobile platforms.

The mobile platform, the stationary platform, the accessory trailer and/or the robot unit can each be designed with identification means. Thereby, the units cannot be unintentionally mixed up. The identification means can be, for example, characters, barcodes and/or RFID identification elements.

Moreover, to achieve the object, the invention provides a method for a modular robot system having the features of claim 14. Advantageous embodiments of the invention are stated in the sub-claims.

By the mobile platform picking up, transporting and positioning the one robot unit for one of the jobs, and the mobile platform picking up, transporting, and positioning the other robot unit for another one of the jobs, the robot units can be flexibly combined with the mobile platform, depending on the job, and then be positioned in the working area of the container processing facility. Moreover, the one robot unit can then carry out the job independent of the mobile platform, so that the mobile platform can be utilized for the other robot unit in the meantime. Consequently, the modular robot system can be better used to capacity.

The method can be carried out with the above-described modular robot system, in particular according to one of claims 1 to 13. Moreover, the method can analogously comprise the features described above with respect to the modular robot system, in particular according to one of claims 1 to 13.

It is conceivable that the one robot unit carries out the one job, while the mobile platform picks up, transports and/or positions the other robot unit for the other job.

The robot units can be withdrawn from a magazine and/or positioned at least at one working site on or with a stationary platform. By the withdrawal from the magazine, the robot units of different types can be particularly easily provided. It is conceivable that a robot unit suited for one of the jobs is provided with the magazine at a transfer point and picked up there by the robot unit. In the process, the robot units can be moved within the magazine with a conveyor means until the suited robot unit is located at the transfer point. By the positioning on or with the stationary platform, the robot unit can be particularly easily and precisely positioned, for example at a container handling machine. It is conceivable that the stationary platform is picked up, transported and positioned for the job together with one of the robot units.

BRIEF DESCRIPTION OF THE FIGURES

FIGS. 1A to 1D show an embodiment of a modular robot system with a mobile platform, robot units of different types, and with a magazine for the robot units in a side view;

FIGS. 3A to 3D show one of the robot units and the mobile platform of FIGS. 1A to 1D with a stationary platform in a side view.

DETAILED DESCRIPTION

Figure 1A:
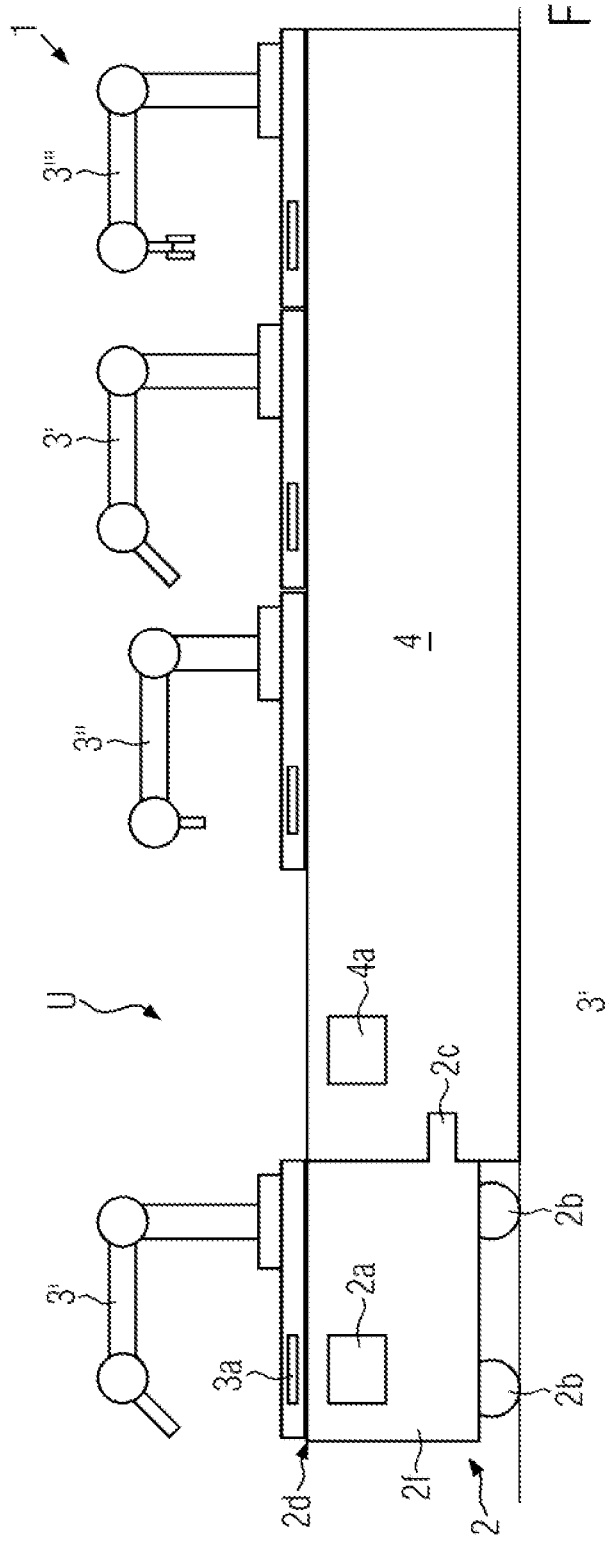
Figure 1B:
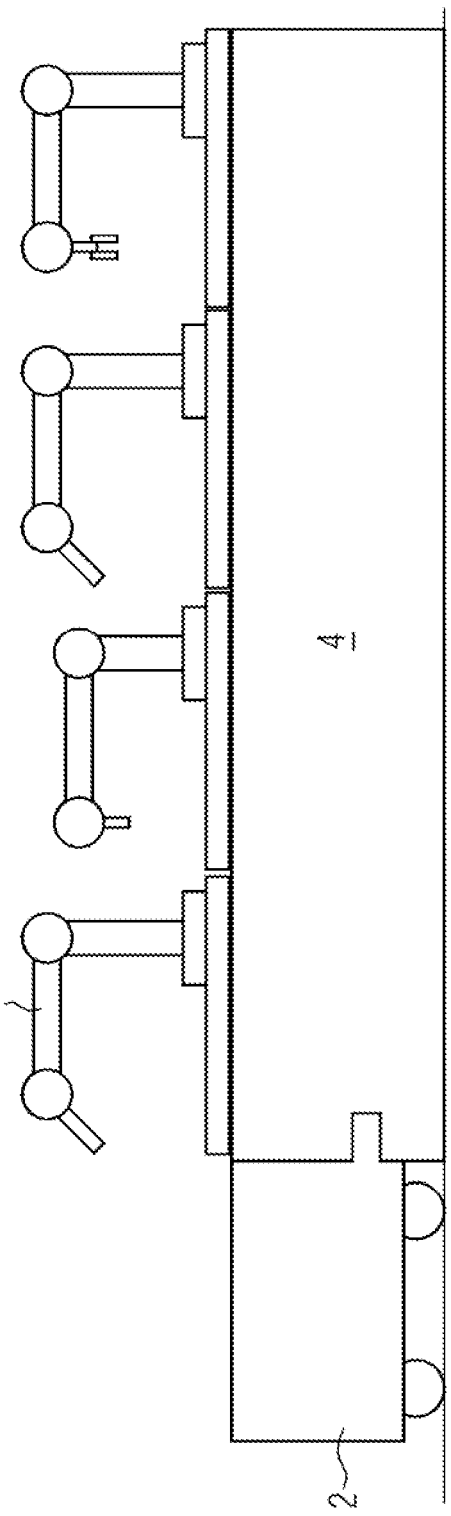

In FIGS. 1A to 1D, an embodiment of a modular robot system 1 with a mobile platform 2, robot units 3', 3", 3'" of different types, and with a magazine 4 for the robot units 3', 3", 3'" is shown in a side view.

One can see the mobile platform 2 with the frame 2f and with the chassis 2b that is supported on the floor for moving in a working area of a container processing facility not represented in greater detail herein. The chassis 2b that is supported on the floor comprises a plurality of wheels which are arranged each at a corner of the frame 2f in the embodiment. All wheels are designed to be driveable and steerable to permit as much freedom of motion as possible for the mobile platform 2. However, it is also conceivable that only three or more than three wheels are arranged at the mobile platform 2. It is moreover conceivable that only part of the wheels are driven and/or steerable.

Moreover, one can see the coupling device 2c by which the platform can be securely connected to the magazine 4 or to an accessory trailer 5 described below.

Moreover, the mobile platform 2 comprises a separate controlling unit 2a to control the mobile platform 2, in particular the chassis 2b. Thereby, the mobile platform 2 is designed to be self-navigating, such that it can move independently within the working area of the container processing facility. To this end, for example, a plan of the working area is stored in the controlling unit 2a, and/or the latter cooperates with locating sensors not shown in greater detail herein.

Moreover, the mobile platform 2 comprises a robot mount 2d which is here, for example, designed as a flat mounting surface to receive one of the robot units 3', 3", 3'" and position it for the job at a container handling machine not shown in greater detail herein.

The robot units 3', 3", 3'" are here designed, for example, as articulated arm robots with one arm and two joints each. Merely as an example, they differ by different tools. However, it is conceivable that the robot units 3', 3", 3'" represent arbitrary differing types suited for a container processing facility.

The robot units 3', 3", 3'" each comprise a separate controlling unit 3a to employ them autonomously from the mobile platform 2 and its controlling unit 2a.

One can also see the magazine 4 from which the robot units 3', 3", 3'" can be selectively withdrawn with the mobile platform 2 and/or returned to it. The magazine 4 also comprises a separate controlling unit 4a, for example, to control a conveyor means for the put-down robot units 3', 3", 3'". Thereby, the robot units can be selectively transported to or away from the transfer point U.

In FIG. 1A, one can see that the robot unit 3' of the first type is picked up with the robot mount. It is now transferred to the magazine 4 at the transfer point U corresponding to FIG. 1B, such that the mobile platform 2 does no longer carry any robot unit. In FIG. 1C, one can see in turn that the magazine 4 has moved the robot units 3', 3", 3'" such that the robot unit 3" of a second type is provided at the transfer point. As can be seen in FIG. 1D, the robot unit 3" is picked up by the mobile platform to subsequently transport it in the container processing facility and position it for the corresponding job.

Figure 2:
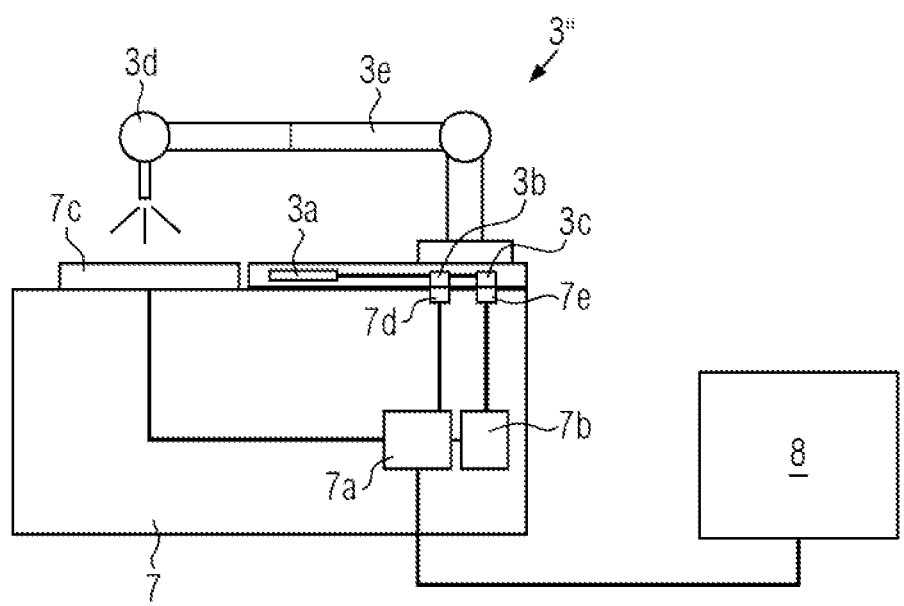
FIG. 2 shows one of the robot units of FIGS. 1A to 1D during the performance of a job in a side view.

This will now be described more in detail with reference to FIG. 2. In FIG. 2, the robot unit 3" of FIGS. 1A to 1D is shown while it is carrying out a job in a side view. One can see that the mobile platform 2 of FIG. 1D has positioned the robot unit 3' at a region of the container handling machine 7 provided for this purpose. The mobile platform 2 itself is not required for carrying out the job, and therefore, it is not shown any more in FIG. 2. It can return, for example, to the magazine and pick up a further robot unit 3', 3", 3'" for another job and position it at another container handling machine.

The container handling machine 7 is here only shown in sections and comprises a conveyor belt 7c for containers which requires regular lubrication. This is being carried out by the robot unit 3". To this end, the robot unit 3" is connected to the container handling machine 7 via the interface 3b, 7d. More in detail, the controlling unit 3a of the robot unit is connected to the controlling unit 7a of the container handling machine 7 via the interface 3b, 7d. However, an air interface is also conceivable. Consequently, the robot unit 3" can emit instructions to the container handling machine 7 via control commands, for example, to continuously move the conveyor belt 7c (actuator unit) further during lubrication.

To this end, the articulated arm 3e of the robot unit 3" is further extended, so that the lubricant nozzle 3d is arranged above the conveyor belt 7c. Consequently, the lubricant nozzle 3d can spray a lubricant onto the conveyor belt 7c. By the continuous further movement of the conveyor belt 7c, all areas will then be uniformly sprayed.

Moreover, one can see that the container handling machine 7 comprises an energy supply unit 7b for the robot unit 3" which is connected to the robot unit 3" via the power supply interface 3c, 7e. Thereby, the robot unit 3" can be directly supplied with energy, or indirectly via a rechargeable battery arranged therein.

One can also see the superordinated controlling centre 8 to control the mobile platform 2, the robot units 3', 3", 3'".

In FIGS. 3A to 3D, the robot unit 3" and the mobile platform of FIGS. 1A to 1D are shown with a stationary platform 6 in a side view.

One can see the stationary platform 6 which is designed here, for example, as a table with the robot unit 3" arranged thereon. According to FIG. 3A, the stationary platform 6 is positioned in the container processing facility (not shown here). Corresponding to FIG. 3B, the mobile platform 2 is now moving to a position below the stationary platform 6 and lifts it, together with the robot unit 3" arranged thereon, by the height H with the lifting unit 2e. Thereby, the stationary platform 6 does no longer touch the floor B, so that it can be transported together with the robot unit 3", for example in the direction R to the position P shown in FIG. 3C. Subsequently, the lifting unit 2e is retracted again at the position P, so that the stationary platform 6 is securely positioned together with the robot unit 3".

As is shown in FIG. 3D, the mobile platform 2 is now driven from below the stationary platform 6 and is thus free to pick up other robot units 3', 3", 3'" with it. The robot unit 3" can now carry out a job at the position P independent of the mobile platform 2.

Figure 4A:
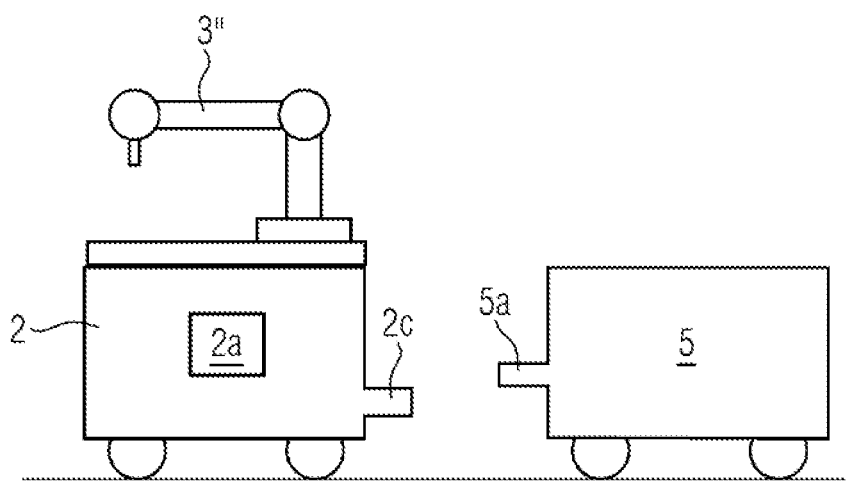
FIGS. 4A to 4B show one of the robot units and the mobile platform of FIGS. 1A to 1D with a couplable accessory trailer in a side view.
Figure 4B:
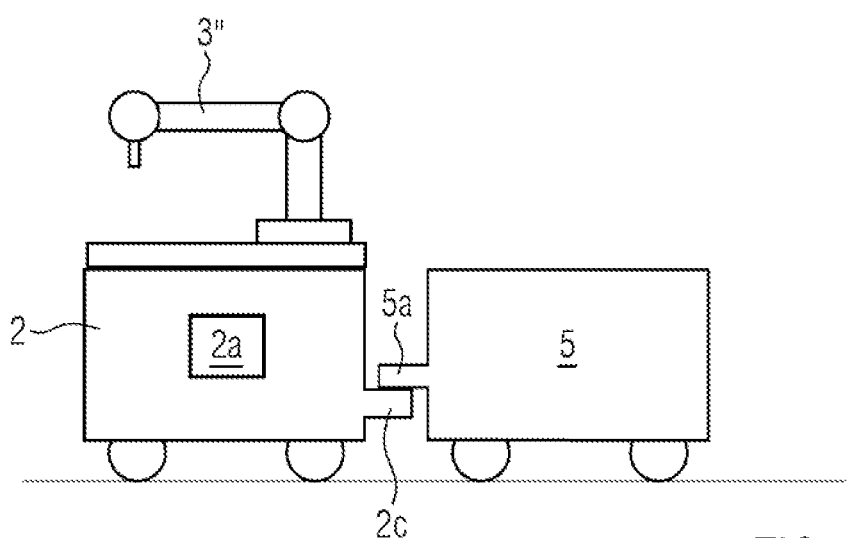

In FIGS. 4A to 4B, the robot unit 3" and the mobile platform of FIGS. 1A to 1D are shown with a couplable accessory trailer 5 in a side view.

One can see that the mobile platform 2 and the accessory trailer 4 each comprise one half of a removable coupling device 3c, 5a which can be controlled, for example, with the controlling unit 2a of the mobile platform 2. Thereby, the mobile platform 2 can drive to the accessory trailer 5 and couple or remove it as required. It is also conceivable that a plurality of different accessory trailers 5 are provided to carry along, depending on the job, the accessory suited for it with the mobile platform 2. For example, the accessory trailer 5 is a lubrication system to supply a lubricant to the robot unit 3". The accessory trailer 5 can be thereby carried along as a lubricant supply, for example, during the lubrication of the conveyor belt 7c.

It is also conceivable that the modular robot system 1 shown in FIGS. 1A to 4 is further developed such that the mobile platform 2, the stationary platform 6, and/or at least one of the robot units 3', 3", 3'" comprise a protection means and/or identification means.

By the mobile platform 2 and/or the robot units 3', 3", 3'" being designed such that the robot units 3', 3", 3'" can be selectively connected to the mobile platform 2 to transport them each in the container processing facility and position them for the respective job, one of the robot units 3', 3", 3'" can be flexibly combined with the mobile platform 2, depending on the job, and then be positioned in the working area of the container processing facility. Moreover, the positioned robot unit 3" can then carry out the job separate from the mobile platform 2, so that the mobile platform 2 can be utilized for another one of the robot units 3', 3'" in the meantime. Consequently, the modular robot system 1 can be better used to capacity.

It will be understood that the features mentioned with reference to the exemplified embodiments are not restricted to these combinations of features but are also possible individually or in any other combinations.

The invention claimed is:

1. A modular robot system for a container processing facility, the modular robot system having:
   a mobile platform comprising a chassis that is supported on a floor for moving in a working area of the container processing facility, and
   multiple robot units of different types for carrying out jobs of different types in the container processing facility,
   wherein either or both the mobile platform and the robot units are designed such that the robot units selectively connect to the mobile platform to transport them each in the container processing facility and position them each for a respective job;
   wherein the container processing facility comprises a plurality of container handling machines that are interconnected via one or more transporters;
   wherein robot mounts for the robot units are arranged at the plurality of container handling machines;
   wherein the multiple robot units each include different tools;
   wherein the modular robot system is configured to withdraw the multiple robot units from a magazine;
   wherein the mobile platform moves forward with the chassis that is supported on the floor in the working area of the container processing facility;
   wherein the mobile platform picks up, transports, and positions one of the robot units for one of the jobs; and
   wherein the mobile platform picks up, transports, and positions another one of the robot units for another one of the jobs.

2. The modular robot system according to claim 1, wherein the mobile platform comprises a robot mount to selectively pick up one of the robot units and position it at a container handling machine for the job.

3. The modular robot system according to claim 1, wherein the mobile platform and the robot units are each designed with a separate controlling unit so that they are autonomously employed.

4. The modular robot system according to claim 1, wherein the mobile platform is designed to be self-navigating.

5. The modular robot system according to claim 1, wherein the modular robot system comprises a stationary platform designed to position or pick up one of the robot units at a working site.

6. The modular robot system according to claim 5, wherein the mobile platform is designed to pick up, transport or position the stationary platform at the working site.

7. The modular robot system according to claim 5, wherein the modular robot system comprises at least one selected from the group consisting of: an accessory trailer couplable to the mobile platform, a set-up part, a cleaning unit, a lubrication system, a lubricant, testing equipment, a spare part and a servicing elements.

8. The modular robot system according to claim 5, wherein the mobile platform, the stationary platform, at least one of the robot units, or a combination thereof comprises protection elements.

9. The modular robot system according to claim 1, wherein the modular robot system comprises the magazine for the robot units designed such that the robot units are selectively or sequentially withdrawn from the magazine with the mobile platform.

10. The modular robot system according to claim 1, wherein at least at one working site, at least one sensor unit and at least one actuator unit is arranged which are connected to at least one of the robot units via an electric interface or an air interface.

11. The modular robot system according to claim 1, wherein at least at one working site, an energy or media supply unit for the robot units or for the mobile platform is arranged.

12. The modular robot system according to claim 1, wherein the modular robot system comprises a superordinated controlling centre to control the mobile platform and the robot units.

13. The modular robot system according to claim 7, wherein the mobile platform, the stationary platform, the accessory trailer, the robot units, or a combination thereof are each designed with an identification element.

14. A method for a modular robot system having a mobile platform and having multiple robot units of different types, comprising:
    withdrawing the multiple robot units from a magazine;
    wherein the mobile platform moves forward with a chassis that is supported on a floor in a working area of a container processing facility,
    wherein the robot units carry out jobs of different types in the container processing facility,
    wherein the mobile platform picks up, transports and positions one of the robot units for one of the jobs, and
    wherein the mobile platform picks up, transports and positions another one of the robot units for another one of the jobs;
    wherein the container processing facility comprises a plurality of container handling machines that are interconnected via one or more transporters; and
    wherein robot mounts for the robot units are arranged at the plurality of container handling machines.

15. The method according to claim 14, wherein the robot units are withdrawn from the magazine at least at one working site on or with a stationary platform.

* * * * *